US008412553B2

United States Patent
Fuse

(10) Patent No.: US 8,412,553 B2
(45) Date of Patent: Apr. 2, 2013

(54) INFORMATION PROCESSING SYSTEM, INFORMATION PROCESSING METHOD, AND COMPUTER READABLE MEDIUM STORING PROGRAM

(75) Inventor: Tohru Fuse, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 370 days.

(21) Appl. No.: 12/766,596

(22) Filed: Apr. 23, 2010

(65) Prior Publication Data

US 2011/0113430 A1 May 12, 2011

(30) Foreign Application Priority Data

Nov. 9, 2009 (JP) ................................. 2009-255910

(51) Int. Cl.
*G06F 9/46* (2006.01)
(52) U.S. Cl. ...................................................... 705/7.16
(58) Field of Classification Search .................. 705/7.11, 705/7.16
See application file for complete search history.

(56) References Cited

U.S. PATENT DOCUMENTS

| 7,844,370 B2 * | 11/2010 | Pollack et al. ................. 700/291 |
| 2004/0039624 A1 * | 2/2004 | Ikezawa et al. .................... 705/8 |
| 2007/0179640 A1 * | 8/2007 | Moughler ........................ 700/36 |
| 2008/0126165 A1 * | 5/2008 | Buchner ............................ 705/8 |
| 2008/0255919 A1 * | 10/2008 | Gorder .............................. 705/9 |
| 2008/0275594 A1 * | 11/2008 | de Guzman ................... 700/253 |
| 2009/0037014 A1 * | 2/2009 | Hotta et al. ................... 700/103 |
| 2009/0138316 A1 * | 5/2009 | Weller et al. ...................... 705/9 |

FOREIGN PATENT DOCUMENTS

| JP | 2004-110467 A | 4/2004 |
| JP | 2009-070339 A | 4/2009 |

* cited by examiner

*Primary Examiner* — Romain Jeanty
(74) *Attorney, Agent, or Firm* — Sughrue Mion, PLLC

(57) ABSTRACT

An information processing system includes a setting unit, an obtaining unit, a calculating unit, a display information generating unit, and an updating unit. The setting unit sets activity schedule information indicating an activity schedule of a user in an evaluation target period on the basis of an activity which is selected from among plural activities. The obtaining unit obtains activity information specifying the activity that has been performed by at least one point of time within the evaluation target period. The calculating unit calculates a total environmental load value of the activity in the evaluation target period. The display information generating unit generates display information including the total environmental load value and a target value of an environmental load. The updating unit updates the activity scheduled in the activity schedule information.

7 Claims, 8 Drawing Sheets

FIG. 2

| ACTIVITY ID | ACTIVITY NAME | ACTIVITY CATEGORY | AMOUNT OF $CO_2$ EMISSION PER UNIT TIME |
|---|---|---|---|
| A001 | WALK | TRANSPORTATION | 1 |
| A002 | TRAIN | TRANSPORTATION | 5 |
| A003 | BUS | TRANSPORTATION | 10 |
| ⋮ | ⋮ | ⋮ | ⋮ |
| B001 | MY DESK | OFFICE | 3 |
| B002 | MEETING ROOM | OFFICE | 7 |
| | | | |

| ACTIVITY SCHEDULE ID | ACTIVITY NAME | TIME INFORMATION | COMPLETION FLAG |
|---|---|---|---|
| S001 | TRAIN | 8:30 – 9:30 | T |
| S002 | MY DESK | 9:30 – 15:00 | F |
| S003 | TRAIN | 15:30 – 16:30 | F |
| | | | |

FIG. 8

| ACTUAL ACTIVITY ID | ACTIVITY NAME | TIME INFORMATION |
|---|---|---|
| R001 | TRAIN | 8:30 – 9:30 |
| R002 | MEETING ROOM | 10:00 – 12:30 |
| R003 | CONFERENCE ROOM A | 13:00 – 13:30 |
| | | |

INFORMATION PROCESSING SYSTEM, INFORMATION PROCESSING METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2009-255910 filed Nov. 9, 2009.

BACKGROUND (i) Technical Field

The present invention relates to an information processing system, an information processing method, and a computer readable medium storing a program.

(ii) Related Art

Reduction of environmental load has been demanded.

SUMMARY

According to an aspect of the invention, there is provided an information processing system including a setting unit, an obtaining unit, a calculating unit, a display information generating unit, and an updating unit. The setting unit sets activity schedule information indicating the activity schedule of a user in an evaluation target period on the basis of an activity, the activity being selected from among plural activities, environmental load values of the respective plural activities being determined in accordance with a facility, device, or transportation form to be used. The obtaining unit obtains activity information specifying the activity that has been performed by the user by at least one point of time within the evaluation target period. The calculating unit calculates a total environmental load value of the activity of the user in the evaluation target period on the basis of an environmental load value of the activity specified by the activity information obtained by the obtaining unit and an environmental load value of the activity scheduled in the activity schedule information after the activity specified by the activity information. The display information generating unit generates display information including the total environmental load value calculated by the calculating unit and a target value of an environmental load predetermined for the evaluation target period. The updating unit updates the activity scheduled in the activity schedule information after the activity specified by the activity information obtained by the obtaining unit.

BRIEF DESCRIPTION OF THE DRAWINGS

Exemplary embodiment(s) of the present invention will be described in detail based on the following figures, wherein:

FIG. 2 illustrates an example of a basic data table;

FIG. 7 illustrates an example of activity schedule information;

FIG. 8 illustrates an example of actual activity information;

DETAILED DESCRIPTION

Hereinafter, an exemplary embodiment of the present invention will be described with reference to the attached drawings. An information processing system 10 according to the exemplary embodiment is a system that manages activities of a user in an evaluation target period and that calculates and presents environmental load caused by the activities of the user. In the exemplary embodiment, the amount of carbon dioxide emission is used as an index of environmental load. Alternatively, another index such as the amount of energy consumption may be used. In the exemplary embodiment, "activity" may be defined by the type of action and the environment and way in which the action is performed. The information processing system 10 according to the exemplary embodiment may be used for modifying an activity schedule of a user so that an environmental load in a target period is within a target value range on the basis of an environmental load value (the amount of carbon dioxide emission) that is presented in accordance with activities of the user in the target period.

Figure 1:
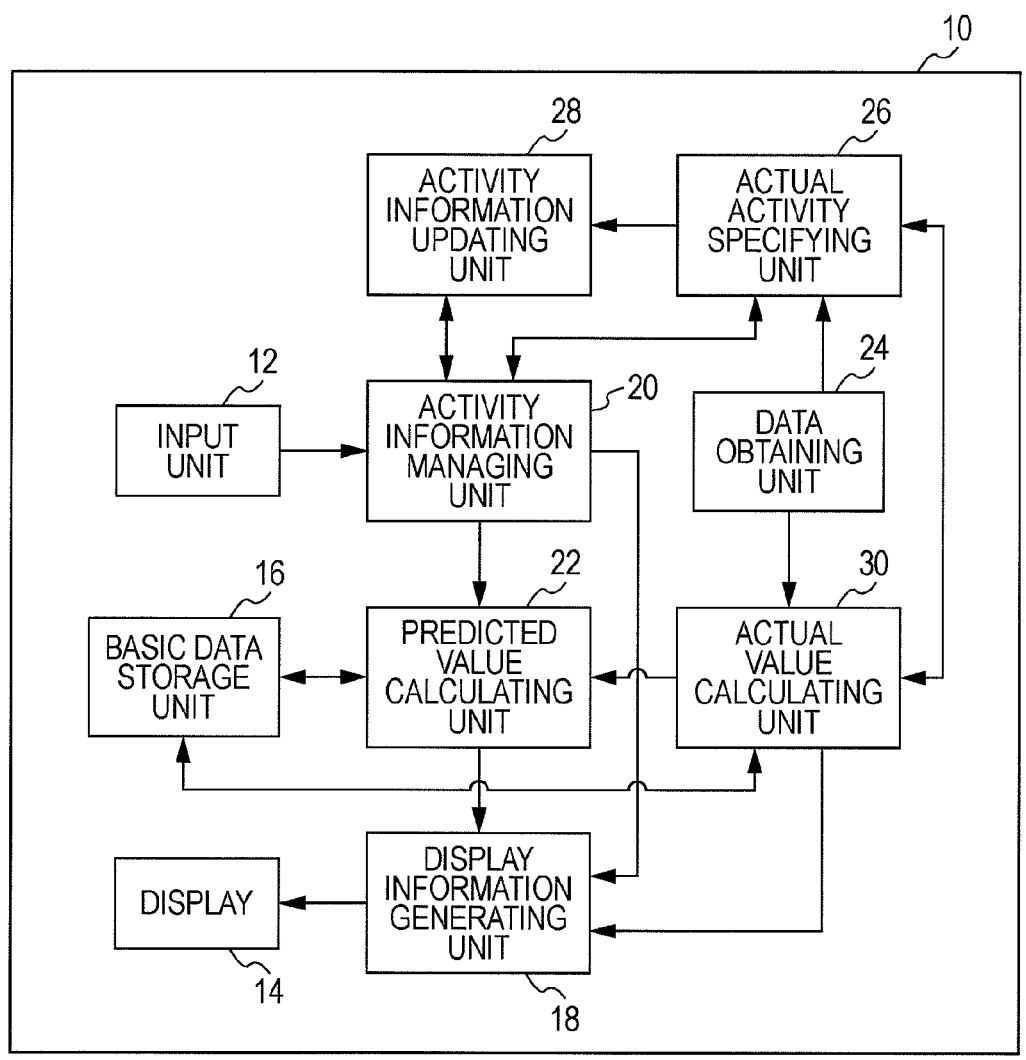
FIG. 1 is a functional block diagram of an information processing system according to an exemplary embodiment of the present invention.

FIG. 1 is a functional block diagram of the information processing system 10 according to the exemplary embodiment. As illustrated in FIG. 1, the information processing system 10 includes an input unit 12, a display 14, a basic data storage unit 16, a display information generating unit 18, an activity information managing unit 20, a predicted value calculating unit 22, a data obtaining unit 24, an actual activity specifying unit 26, an activity information updating unit 28, and an actual value calculating unit 30.

The functions of the above-described units may be realized when a computer that includes a controller such as a central processing unit (CPU), a storage unit such as a memory, and an input/output unit for transmitting data to/receiving data from an external device reads and executes a program stored in a computer readable information storage medium. The program may be supplied to the information processing system 10 including one or plural computers via an information storage medium or may be supplied via a data communication medium such as the Internet.

The input unit 12 includes an input interface connected to input devices, such as a keyboard and a mouse, and receives input of an operation from a user.

The display 14 includes a display device, such as a liquid crystal display, and outputs and displays graphic data generated by the information processing system 10.

Hereinafter, a function related to a process of setting an activity schedule of a user will be described.

The basic data storage unit 16 stores data indicating environmental load values of respective plural activities based on a facility, device, or transportation form to be used. In the exemplary embodiment, the amount of carbon dioxide emission per unit time is used as an environmental load value.

FIG. 2 illustrates an example of a basic data table stored in the basic data storage unit 16. As illustrated in FIG. 2, the basic data table may be configured as table information indicating activity names, activity categories, and the amounts of carbon dioxide emission per unit time, which are associated with activity IDs that identify respective activities. The activity categories indicate classification of activities. For example, "walk", "train", "bus", and the like belong to the category "transportation", and "my desk", "meeting room", and the like belong to the category "office". Examples of facilities and devices include a lighting facility, an air-conditioning facility, an electronic blackboard, a personal computer, and a video conference system. As for the amount of carbon dioxide emission, amounts for a typical use of a facility, device, or transportation form used in the respective activities may be stored in advance. Also, as for the category "office", the amount of carbon dioxide emission may be selected from among plural prepared values in accordance with the number of participants, and the season and time period of a schedule, thereby reflecting variations of the amount of carbon dioxide emission caused by use of lighting and air-conditioning facilities in accordance with the number of participants, and the season and time period of a schedule.

The display information generating unit 18 generates a user interface (UI) screen that is displayed on the display 14. Hereinafter, an example of the UI screen displayed for setting an activity schedule of a user will be described.

Figure 3:
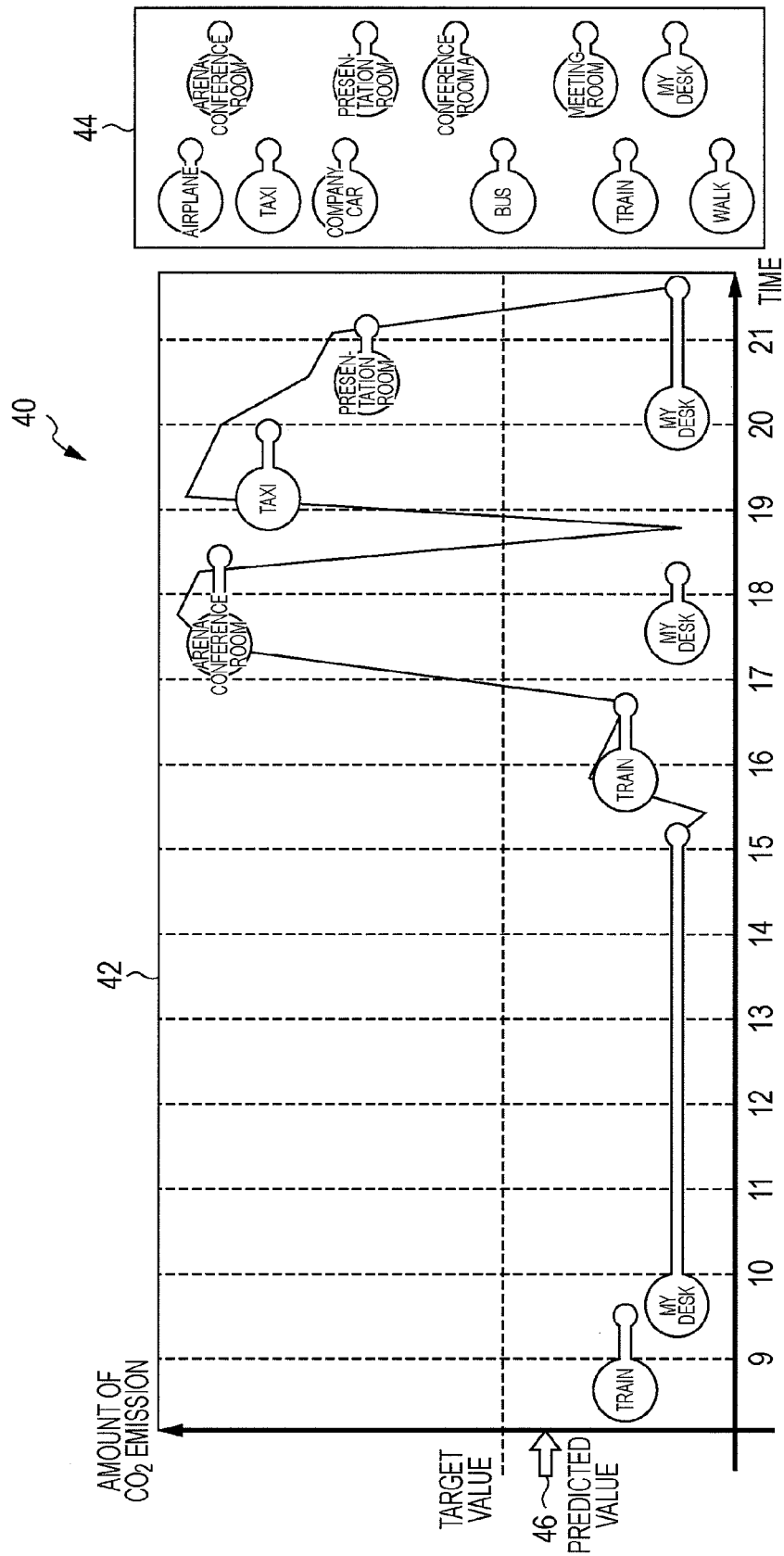
FIG. 3 illustrates an example of an activity management screen.

FIG. 3 illustrates an example of an activity management screen 40 that is displayed for setting an activity schedule of a user. As illustrated in FIG. 3, the activity management screen 40 includes a graph display area 42 and an icon list display area 44. In the graph display area 42, a graph is displayed in which icons representing activities are placed in the coordinate system, where the horizontal axis (X axis) indicates time and the vertical axis (Y axis) indicates the amount of carbon dioxide emission. The icons are connected by a line in chronological order. In the example illustrated in FIG. 3, the time range along the horizontal axis corresponds to working hours of a day, but the scale of the time range may be changed to units of weeks or units of months.

In the icon list display area 44, icons corresponding to activities of the user are displayed. The positions in the Y axis direction (vertical direction) of the individual icons correspond to the amounts of carbon dioxide emission per unit time, and the positions in the X axis direction (horizontal direction) thereof correspond to the activity categories to which the activities belong. By dragging and dropping icons displayed in the icon list display area 44 into the graph display area 42, an activity schedule of the user and start times of the activities are set.

The position with respect to the vertical axis of each icon displayed in the graph display area 42 is determined in accordance with the amount of carbon dioxide emission per unit time of the activity corresponding to the icon, and the portion extending in the positive direction along the X axis from the icon indicates the duration of the activity corresponding to the icon. The broken line extending in the X axis direction in the graph display area 42 indicates a target value of the total amount of carbon dioxide emission in a target period, and the arrow 46 on the Y axis indicates a predicted value of the total amount of carbon dioxide emission caused by activities that are set. The positions and durations of the icons and the target value displayed in the graph display area 42 may be changed by performing a dragging operation on corresponding display elements.

Figure 4A:
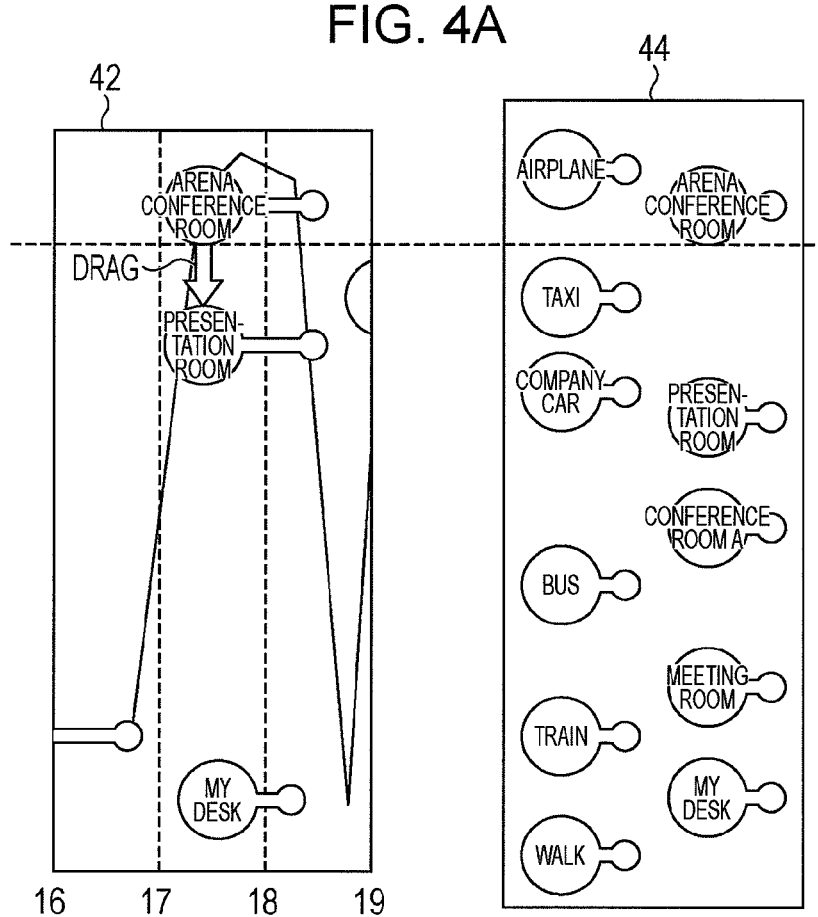
FIG. 4A is a diagram for explaining a process of switching the type of activity in accordance with movement of an icon.

FIG. 4A is a diagram for explaining a process of switching the type of activity in accordance with movement of an icon displayed in the graph display area 42. In the exemplary embodiment, when an icon representing an activity is dragged so as to be moved in the Y axis direction, the icon is switched to an icon representing an activity of the amount of carbon dioxide emission corresponding to the post-movement position in the Y axis direction in the activity category to which the icon belongs. In the example illustrated in the figure, the activity categories include "transportation" and "office". The category "transportation" includes "airplane", "taxi", "company car", "bus", "train", and "walk". The category "office" includes "arena conference room", "presentation room", "conference room A", "meeting room", and "my desk".

As illustrated in FIG. 4A, when the icon "arena conference room" is moved downward, the icon is switched to the icon "presentation room", which is of a grade of the amount of carbon dioxide emission lower by one step in the same category "office", at the position just under a reference value of the amount of carbon dioxide emission of "arena conference room". In contrast, when the icon "presentation room" is moved upward, the icon is switched to the icon "arena conference room" at the position of the reference value of the amount of carbon dioxide emission of "arena conference room".

Figure 4B:
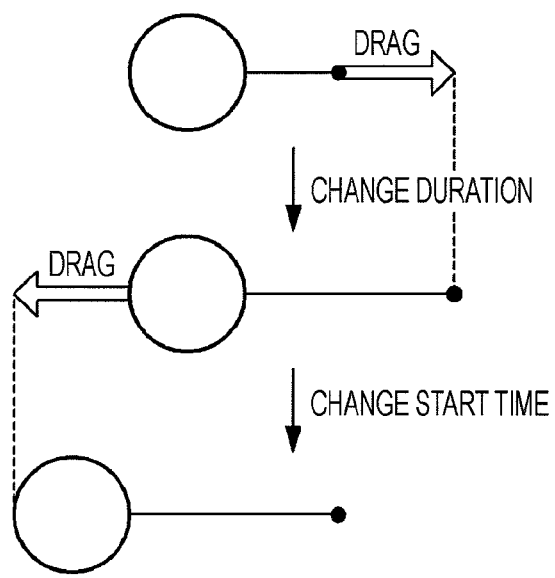
FIG. 4B is a diagram for explaining a process of changing time information of an activity.

FIG. 4B is a diagram for explaining a process of changing time information of an activity. As illustrated in FIG. 4B, when the end of a line segment extending from an icon representing an activity is dragged so as to be moved, the length of the line segment changes, whereby the duration of the activity is set in accordance with the length of the line segment. When the icon itself is dragged so as to be moved, the start time of the activity is set in accordance with the position of the icon.

Figure 5:
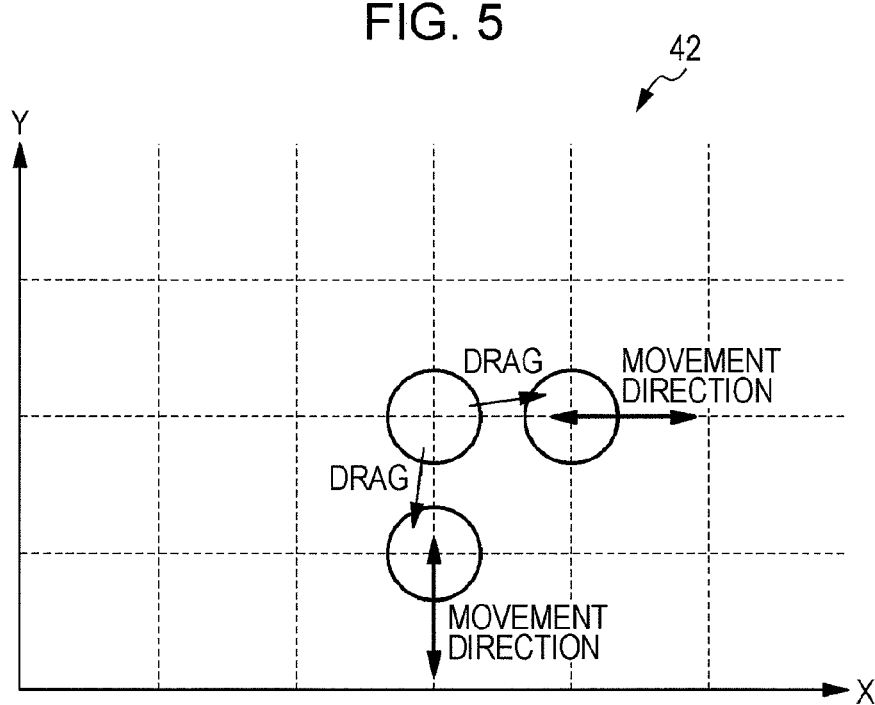
FIG. 5 is a diagram for explaining a first movement control method for icons.

FIG. 5 is a diagram for explaining a first movement control method for icons in the information processing system 10. As illustrated in FIG. 5, a grid pattern with predetermined intervals is formed in the graph display area 42, and an icon is placed at an intersection of grid lines. In the information processing system 10, when an operation of dragging and moving an icon placed in the graph display area 42 is detected, the movement of the icon may be limited to the direction having a larger movement amount among the X axis and Y axis directions of the movement direction at the start of movement. Specifically, when the icon is moved in the X axis direction (or Y axis direction) by a dragging operation, the movement direction of the icon by the dragging operation is limited to the X axis direction (or Y axis direction), and the movement amount in the Y axis direction (or X axis direction) may be fixed to zero. Additionally, when the dragging operation of the icon is stopped, limiting of the movement direction of the icon may be canceled.

Figure 6:
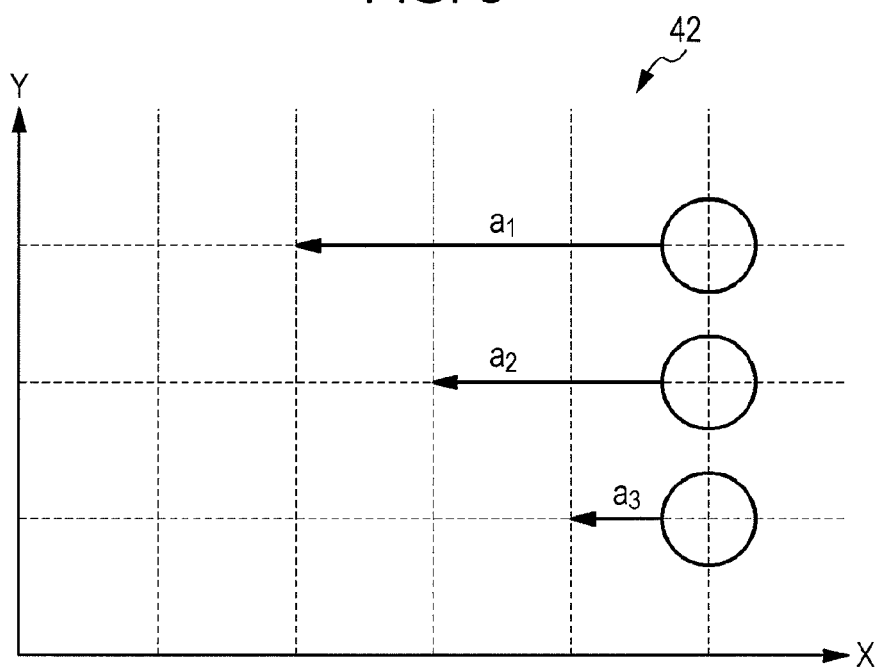
FIG. 6 is a diagram for explaining a second movement control method for icons.

FIG. 6 is a diagram for explaining a second movement control method for icons in the information processing system 10. As illustrated in FIG. 6, in the information processing system 10, when an operation of dragging and moving an icon displayed in the graph display area 42 is detected, the movement amount of the icon may be changed in accordance with the acceleration of the movement caused by the dragging operation. Specifically, a movement step (the unit of movement amount) may be increased when the acceleration is high, and the movement step may be decreased when the acceleration is low. With such control of the movement amount of an icon, the icon may be quickly placed at a desired position with rough positioning, and the position of the icon may be finely adjusted to finally determine the position.

The activity information managing unit 20 generates and manages activity schedule information indicating an activity schedule of a user in a target period on the basis of icons placed in the graph display area 42 and the positions and durations of the respective icons.

FIG. 7 illustrates an example of activity schedule information that is managed by the activity information managing unit 20. As illustrated in FIG. 7, the activity schedule information may be configured as a table that indicates activity names, time information indicating time periods when respective activities are performed, and completion flags indicating whether respective activities have been completed, which are associated with activity schedule IDs that identify activities (schedule). Regarding the completion flags, "T (true)" represents that the activity has been completed whereas "F (false)" represents that the activity has not been completed.

The predicted value calculating unit 22 calculates the total amount of carbon dioxide emission (environmental load value) caused by all activities indicated by activity schedule information on the basis of the activity schedule information managed by the activity information managing unit 20. Specifically, the predicted value calculating unit 22 may add the amounts of carbon dioxide emission corresponding to respective activity schedule IDs, each amount being obtained by multiplying the amount of carbon dioxide emission per unit time of the activity by the duration of the activity, with reference to the basic data table and the activity schedule information, thereby obtaining the total amount of carbon dioxide emission. The position of the arrow 46 displayed on the Y axis of the graph display area 42 is determined on the basis of the total amount of carbon dioxide emission calculated by the predicted value calculating unit 22.

Next, a description will be given about a function related to a process of updating the activity management screen 40 on the basis of an activity that is actually performed by a user in a target period of an activity schedule.

The data obtaining unit 24 obtains various data about a user. For example, the data obtaining unit 24 may receive an input of activity information indicating a completed activity from the user by e-mail or the like, and may obtain entrance/leaving information or transportation usage information of the user via an IC card owned by the user.

The actual activity specifying unit 26 specifies an activity that has actually been performed by a user on the basis of data obtained by the data obtaining unit 24. For example, in a case where a user has registered a completed activity in the activity information managing unit 20 or another scheduler, the actual activity specifying unit 26 may specify the type and time information of the completed activity. Alternatively, the actual activity specifying unit 26 may specify the type and time information of the activity performed by the user by executing a mail server program, receiving an e-mail indicating the type of activity from an e-mail address of the user (an e-mail address of a mobile phone may also be used) at the start of the activity, and receiving an e-mail indicating completion of the activity at the end of the activity. When an e-mail is used, a destination (or title) corresponding to the start of the activity and a destination (or title) corresponding to the end of the activity may be set, and the start/end of a scheduled activity near the reception time of an e-mail may be determined.

When obtaining entrance/leaving information of a user on the basis of an IC card that stores or is associated with the entrance/leaving information of the user, the actual activity specifying unit 26 may specify information about a conference room used by the user and the time of the conference on the basis of the obtained entrance/leaving information. Also, when reading route information of transportation used by a user from an IC card, the actual activity specifying unit 26 may specify a transportation form used by the user and a traveling time on the basis of the read route information. The actual activity specifying unit 26 is not limited to the above-described example, and may specify an activity of a user by obtaining information from an entrance/leaving management system or an activity monitoring system based on sensor information according to the related art.

The activity information updating unit 28 updates activity schedule information and actual activity information that are managed by the activity information managing unit 20 on the basis of an activity specified by the actual activity specifying unit 26. Specifically, the activity information updating unit 28 updates completion flags of activity schedule information that is managed by the activity information managing unit 20 on the basis of information about completed activities, and stores the history of the completed activities in the form of actual activity information.

FIG. 8 illustrates an example of actual activity information. As illustrated in FIG. 8, the actual activity information may be configured as a table indicating activity names and time information, which are associated with actual activity IDs that identify respective completed activities.

The actual value calculating unit 30 calculates the value (actual value) of the amount of carbon dioxide emission (environmental load value) caused by actual activities of a user on the basis of the history of activities indicated by actual activity information. Specifically, the actual value calculating unit 30 adds the amounts of carbon dioxide emission corresponding to respective actual activity IDs indicated by the actual activity information, each amount being obtained by multiplying the amount of carbon dioxide emission per unit time of the activity by the duration of the activity, thereby calculating the actual value of the amount of carbon dioxide emission.

The predicted value calculating unit 22 calculates a predicted value of the total amount of carbon dioxide emission (total environmental load value) of a user in a target period on the basis of activities that have been performed by the user and a future activity schedule. Specifically, the predicted value calculating unit 22 extracts activity schedule IDs with a completion flag of "F" from among the activity schedule IDs indicated by the activity schedule information managed by the activity information managing unit 20. Then, the predicted value calculating unit 22 adds values each calculated by multiplying the amount of carbon dioxide emission per unit time by an activity schedule time of a corresponding activity, so as to obtain the amount of carbon dioxide emission, adds the obtained amount of carbon dioxide emission and the actual value of the amount of carbon dioxide emission calculated by the actual value calculating unit 30, thereby calculating a predicted value of the total amount of carbon dioxide emission in the target period.

The display information generating unit 18 updates the information displayed on the activity management screen 40 for a user on the basis of an actual activity specified by the actual activity specifying unit 26 and the values of the amounts of carbon dioxide emission calculated by the actual value calculating unit 30 and the predicted value calculating unit 22.

Figure 9:
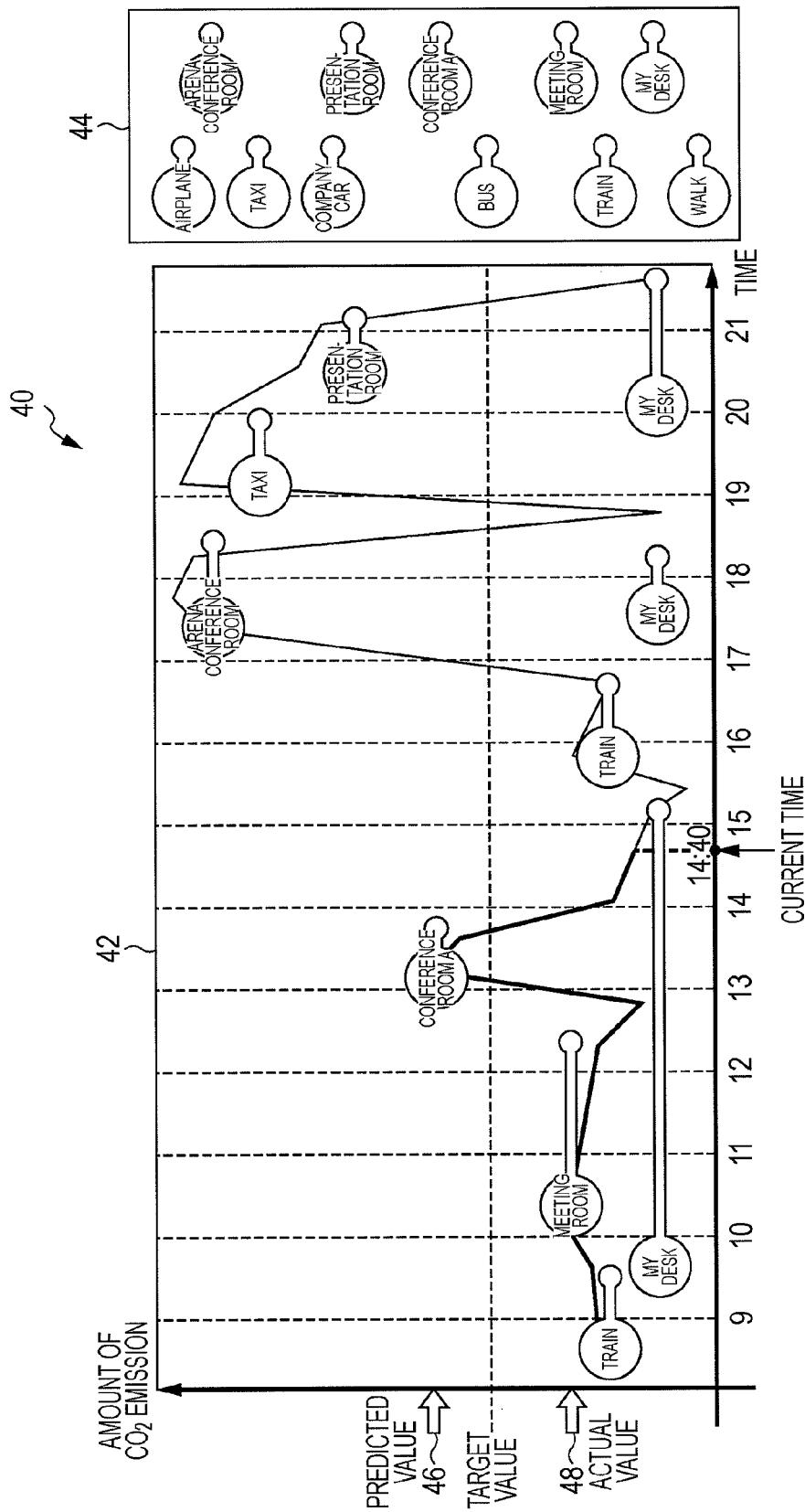
FIG. 9 illustrates an example of an activity management screen that has been updated after an actual activity of a user has been specified.

FIG. 9 illustrates an example of the activity management screen 40 that has been updated after actual activities of a user have been specified. As illustrated in FIG. 9, icons representing the activities actually performed by the user by a target time (e.g., current time) and an arrow 48 indicating an actual value of the amount of carbon dioxide emission based on the actual activities have been added to the activity management screen 40. Also, in the activity management screen 40, the position of the arrow 46 indicating a predicted value of the amount of carbon dioxide emission has been updated on the basis of the predicted value that has been updated on the basis of the actual activities. Note that, in FIG. 9, an actual activity is indicated with a bold line.

The activity schedule from the target time (e.g., current time) may be changed. When the activity schedule is changed, the amount of carbon dioxide emission is calculated again by the predicted value calculating unit 22 in accordance with the change, and the value of the total amount of carbon dioxide emission is updated. The user may appropriately review a future activity schedule so that the total amount of carbon dioxide emission in a target period is within a target value range by comparing a predicted value of the total amount of carbon dioxide emission with the target value, while referring to the activity management screen 40 that is occasionally updated in accordance with transition of actual activities.

Figure 10:
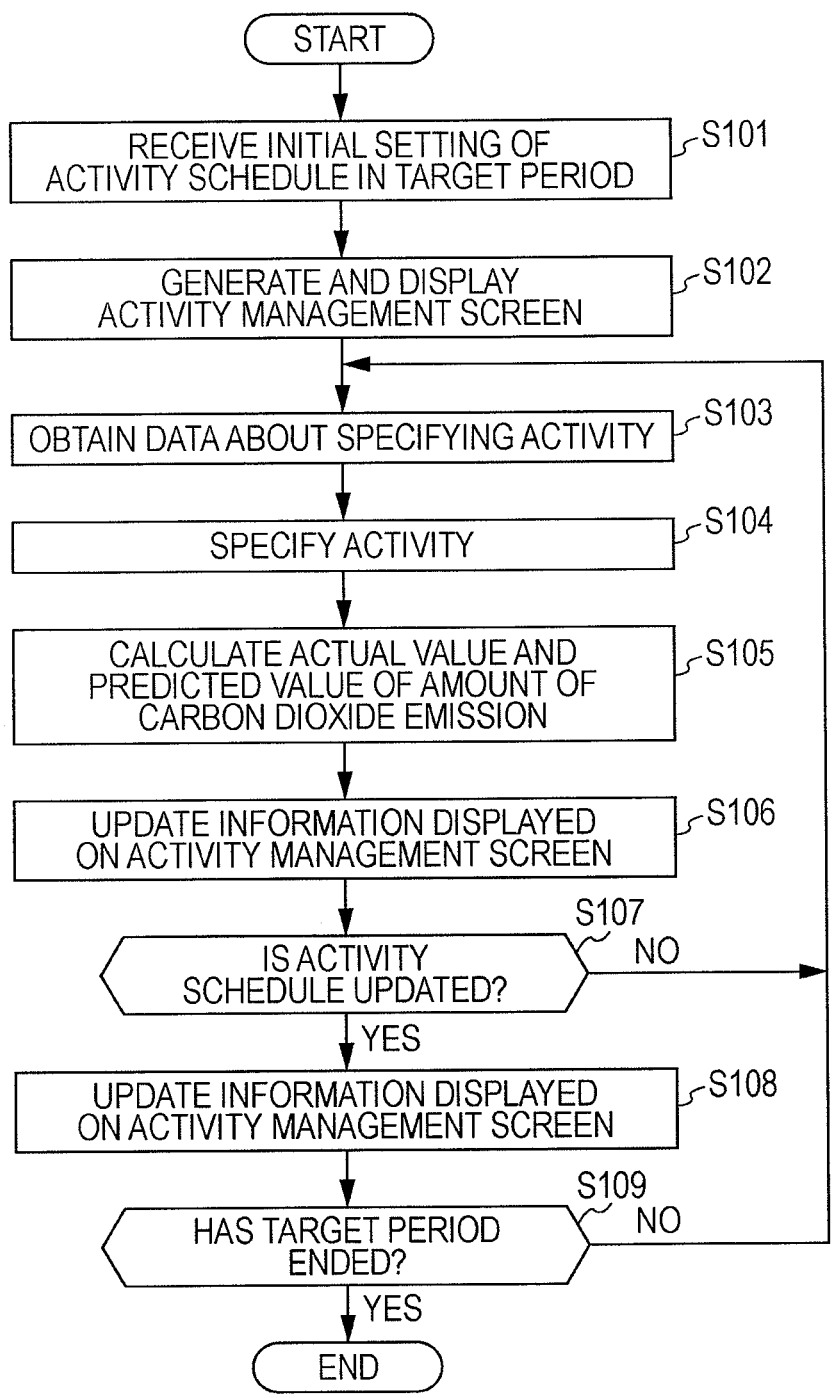
FIG. 10 is a flowchart of a process of updating an activity management screen.

Next, a description will be given about an update process of the activity management screen 40 with reference to the flowchart illustrated in FIG. 10. As illustrated in FIG. 10, the information processing system 10 receives an initial setting of an activity schedule in a target period from a user (S101), and generates and displays the activity management screen 40 on the basis of the received initial setting (S102). Subsequently, the information processing system 10 obtains data about specifying an activity of the user in the target period (S103), specifies the activity that has been performed by the user (S104), calculates an actual value and a predicted value of the amount of carbon dioxide emission in accordance with the specified activity (S105), and updates the information displayed on the activity management screen 40 (S106).

In a case where the activity schedule from the current time is updated by an input from the user (YES in S107), the information processing system 10 updates the information displayed on the activity management screen 40 in accordance with the updated activity schedule (S108). In a case where the activity schedule is not updated (NO in S107) or where the target period has not ended (NO in S109), the process returns to S103 and the information processing system 10 repeats the process. In a case where the target period has ended (YES in S109), the information processing system 10 ends the process.

The present invention is not limited to the above-described exemplary embodiment. For example, the activity management screen 40 for a single user is generated in the above-described exemplary embodiment, but the activity management screen 40 may be generated for plural users. In that case, the activity schedule of each user may be adjusted so that the amount of carbon dioxide emission of the entire group of the users is below a target value.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
  a processor that controls the information processing system to function as:
    a setting unit that sets activity schedule information indicating an activity schedule of a user in an evaluation target period on the basis of an activity which is selected from among a plurality of activities, wherein environmental load values of the respective plurality of activities are determined in accordance with a facility, device, or transportation form to be used;
    an obtaining unit that obtains activity information specifying the activity that has been performed by the user by at least one point of time within the evaluation target period;
    a calculating unit that calculates a total environmental load value of the activity of the user in the evaluation target period on the basis of an environmental load value of the activity specified by the activity information obtained by the obtaining unit and an environmental load value of the activity scheduled in the activity schedule information after the activity specified by the activity information;
    a display information generating unit that generates display information including the total environmental load value calculated by the calculating unit and a target value of an environmental load predetermined for the evaluation target period; and
    an updating unit that updates the activity scheduled in the activity schedule information after the activity specified by the activity information obtained by the obtaining unit.

2. The information processing system according to claim 1, wherein each of the plurality of activities is associated with an image, and
  wherein the display information generating unit generates display information in which the image associated with the activity schedule of a user is placed at a coordinate position in a coordinate system, the coordinate system having coordinate axes including a first axis indicating time and a second axis indicating the environmental load value, the coordinate position corresponding to the time when the activity is performed and the environmental load value of the activity.

3. The information processing system according to claim 2, wherein, in a case where a position with respect to the first axis of the image placed in the coordinate system is changed, the updating unit updates time information of the activity corresponding to the image in accordance with the changed position.

4. The information processing system according to claim 2, wherein, in a case where a position with respect to the second axis of the image placed in the coordinate system is changed, the updating unit changes the activity corresponding to the image to an activity corresponding to the changed position.

5. The information processing system according to claim 1, wherein the display information generating unit generates display information including a total environmental load value of the activity specified by the activity information obtained by the obtaining unit.

6. An information processing method comprising:
  setting activity schedule information indicating an activity schedule of a user in an evaluation target period on the basis of an activity which is selected from among a plurality of activities, wherein environmental load values of the respective plurality of activities are determined in accordance with a facility, device, or transportation form to be used;
  obtaining activity information specifying the activity that has been performed by the user by at least one point of time within the evaluation target period;
  calculating, by a processor, a total environmental load value of the activity of the user in the evaluation target period on the basis of an environmental load value of the activity specified by the obtained activity information and an environmental load value of the activity scheduled in the activity schedule information after the activity specified by the activity information;

generating display information including the calculated total environmental load value and a target value of an environmental load predetermined for the evaluation target period; and updating the activity scheduled in the activity schedule information after the activity specified by the obtained activity information.

7. A non-transitory computer readable medium storing a program causing a computer to execute a process, the process comprising:

setting activity schedule information indicating an activity schedule of a user in an evaluation target period on the basis of an activity which is selected from among a plurality of activities, wherein environmental load values of the respective plurality of activities are determined in accordance with a facility, device, or transportation form to be used;

obtaining activity information specifying the activity that has been performed by the user by at least one point of time within the evaluation target period;

calculating a total environmental load value of the activity of the user in the evaluation target period on the basis of an environmental load value of the activity specified by the obtained activity information and an environmental load value of the activity scheduled in the activity schedule information after the activity specified by the activity information;

generating display information including the calculated total environmental load value and a target value of an environmental load predetermined for the evaluation target period; and updating the activity scheduled in the activity schedule information after the activity specified by the obtained activity information.

* * * * *